US011245705B2

(12) United States Patent
Sloane et al.

(10) Patent No.: US 11,245,705 B2
(45) Date of Patent: Feb. 8, 2022

(54) INTUITIVE RESOURCE MANAGEMENT PLATFORM

(71) Applicant: BANK OF AMERICA CORPORATION, Charlotte, NC (US)

(72) Inventors: Brandon Sloane, Santa Barbara, CA (US); Lydia Lambright, Charlotte, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 247 days.

(21) Appl. No.: 16/539,626

(22) Filed: Aug. 13, 2019

(65) Prior Publication Data

US 2021/0051155 A1 Feb. 18, 2021

(51) Int. Cl.
*H04L 29/06* (2006.01)

(52) U.S. Cl.
CPC ........ *H04L 63/105* (2013.01); *H04L 63/0861* (2013.01)

(58) Field of Classification Search
CPC ... H04L 63/105; H04L 63/0861; G06F 21/31; H04W 12/66
USPC ........................................................... 726/4
See application file for complete search history.

(56) References Cited

U.S. PATENT DOCUMENTS

| | | | |
|---|---|---|---|
| 5,233,513 A | 8/1993 | Doyle | |
| 5,947,526 A | 9/1999 | Neu | |
| 7,603,621 B2 | 10/2009 | Toyama et al. | |
| 7,788,146 B2 | 8/2010 | McCarthy, Jr. | |
| 8,358,693 B2 | 1/2013 | Lu et al. | |
| 9,367,208 B2 | 6/2016 | Hicks et al. | |
| 9,711,064 B2* | 7/2017 | Nielson | G09B 5/00 |
| 10,158,616 B1* | 12/2018 | Kanevsky | G06F 21/46 |
| 10,410,539 B2* | 9/2019 | Nielson | A61B 5/374 |
| 2012/0011594 A1* | 1/2012 | Nguyen | G06F 21/6218 726/28 |
| 2014/0164198 A1 | 6/2014 | Caldwell | |
| 2015/0187018 A1* | 7/2015 | Knaust | G06Q 10/10 705/4 |
| 2017/0249168 A1 | 8/2017 | Daneshvar et al. | |
| 2018/0182025 A1 | 6/2018 | Smith et al. | |

OTHER PUBLICATIONS

The analysis of value chain and application models on m-commerce, Chen Xin, Nov. 2009 (Year: 2009).*
Indrani Medhi et al., Optimal Audio-Visual Representations for Illiterate Users of Computers. retrieved Oct. 28, 2020 https://www.microsoft.com/en-us/research/wp-content/uploads/2016/02/Medhi_www2007.pdf.

* cited by examiner

*Primary Examiner* — Jahangir Kabir
(74) *Attorney, Agent, or Firm* — Moore & Van Allen PLLC; James C. Edwards

(57) ABSTRACT

A system for making specified resource management services available to a user through a mobile application and/or online portal based on the user's determined level of resource management competency. Further, an intuitive platform for resource management is provided that can provide instinctual guidance throughout the entire lifecycle of a user's engagement with the resource management entity, including but, not limited to, onboarding, providing services to the users, allowing the user to conduct resource interactions and the like.

18 Claims, 6 Drawing Sheets

INTUITIVE RESOURCE MANAGEMENT PLATFORM

FIELD OF THE INVENTION

The present invention is generally related to resource management and, more specifically, providing a resource management platform that provides users with access to resource management services depending on their respective resource management level of competency and intuitively allows such users to perform requisite resource management functions related to the accessible services.

BACKGROUND

Conventional resource management platforms require a certain level of resource management competency in order to perform all the functions required by services presented in the platform.

Therefore, a need exists to develop systems, methods, computer program products and the like that provide for users with minimal resource management competency to perform requisite resource management functions. In addition, a need exists to insure that resource management services presented to a user commensurate with the level of resource management competency shown by the user.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing systems, methods, computer program product and/or the like that provides for making specified resource management services available to a user based on the user's determined level of resource management competency. In specific embodiments of the invention, initial inputs to a mobile application and/or online portal, such inputs received during an onboarding process, are accessed to determine the user's initial level of resource management competency and, in response, specified resource management services are made accessible to the user. Over time, further inputs to the mobile application and/or online portal are received and machine learning techniques are implemented to determine if, and when, the user's resource management competency has increased. In response to determining that the user's resource management competency has increased, additional services may be made accessible to the user.

In additional embodiments of the invention an intuitive platform for resource management is provided. The resource management platform of the present invention aids users which may not the possess the skills and/or resource management competency required of conventional resource management platforms. The intuitive management resource management platform, which may comprise a mobile application, an online portal or the like, is capable of providing instinctual guidance throughout the entire lifecycle of a user's engagement with a resource management entity, including but, not limited to, onboarding, providing services to the users, allowing the user to conduct resource interactions and the like.

In specific embodiments of the invention a delegator (i.e., another more competent user) is assigned to the user to assist in rendering services (e.g., the delegator holds a resource depository and the user/delegatee has access to at least a portion of the resources held therein).

A system for resource management defines first embodiments of the invention. The system includes a mobile communication device having a computing platform including a memory and at least one processing device in communication with the memory. Additionally, the system includes a resource management application stored in the memory and including first instructions that are executable by the at least one processing device. The first instructions are configured to receive a plurality of inputs from a user and determine, based on the first inputs, a resource-related competency level for the user. The first instructions are further configured to determine a plurality of services that are associated with the resource-related competency level, and provide, within the resource management application, user-access to the plurality of services.

In specific embodiments of the system, the first instructions are configured to receive a plurality of first inputs from the user (e.g., inputs associated with resource management onboarding or the like) determine, based on the first inputs, an initial/baseline resource-related competency level for the user. Further, in such embodiments of the system, the first instructions are configured to determine a plurality of first services that are associated with the initial resource-related competency level and provide, within the resource management application, user-access to the plurality of services. Additionally, in such embodiments of the system, the first instructions are configured to receive, on an ongoing basis throughout a lifecycle of the resource management process, a plurality of second inputs from the user and determine, based on the second inputs and machine-learning techniques, an increased resource-related competency level for the user. Further, in such embodiments of the system, the first instructions are configured to determine a plurality of second services that are associated with the increased resresource-related competency level, and provide, within the resource management application, user-access to the plurality of second services.

In still further specific embodiments of the system, the resource management application further includes a resource management onboarding routine that is stored in the memory and including second instructions that are executable by the at least one processing device. The second instructions are configured to establish an identity of the user, absent the user providing a textual input, and associate a resource storage entity to the identity. In such embodiments of the system, the identity may be established by receiving biometric data from the user and/or implementing at least one of pattern and picture recognition techniques. Further, in such embodiments of the system, the resource storage entity may be associated to the identity by creating the resource storage entity for the user absent the user providing textual input or comprehending written text, for example, providing an audio output that reads resource storage entity instructions and obligations to the user and provides for the user to provide a non-textual input for accepting creation of the resource storage entity. In other related embodiments of the system, the resource storage entity is associated to the identity by delegating the user to use the resource storage entity held by a secondary user, for example, providing an audio output that reads resource storage entity delegation instructions and obligations to the user and provides for the user to provide a non-textual input for delegation of the resource storage entity to the user.

In other specific embodiments of the system, the resource management application further comprises a resource management service routine that is stored in the memory and includes third instructions. The third instructions are configured to instruct the user to perform a resource interaction via one or more non-textual commands including, but not limited to picture icons, audio commands, guided combination of keystrokes, and automatic suggestions for a next step based on one or more user patterns of behavior.

In other specific embodiments of the system, the third instructions are configured to, in response to the user initiating a resource interaction, determine (i) a current volume of resources in a resource storage entity and/or a resource allocation category associated with the resource interaction and (ii) a post-resource interaction volume of resources remaining in the resource storage entity and/or the resource allocation category after completion of the resource interaction. Further, in such embodiments of the system, the instructions are further configured to present, to the user via a display of the mobile communication device, non-numeric visual indicators that indicate the current volume of resources in a resource storage entity and/or resource allocation category and the post-resource interaction volume of resources remaining in the resource storage entity and/or resource allocation category.

In other related embodiments of the system, the third instructions are further configured to provide the user an ability to create one or more resource distribution categories with non-textual visual indicators that indicate a resource allocation category and non-numeric visual indicators to indicate an amount of resources designated to the one or more resource distribution categories for a predetermined time period.

In still further related embodiments of the system, the third instructions are further configured to determine at least one of (i) a resource interaction amount exceeds a predetermined resource interaction threshold, and (ii) a resource interaction amount exceeds a predetermined resource interaction category threshold, and, in response, notify a predetermined third-party entity of the resource interaction, and receive approval for the resource interaction to proceed from the predetermined third-party entity.

Moreover, in other specific embodiments of the system, the third instructions are further configured to generate and initiate communication of a resource management report to at least the user including non-numeric and non-textual visual indicators indicating historical resource interactions and volume of resources in one or more associated resource storage entities.

A computer-implemented method for resource management implemented by one or more computing device processors defines second embodiments of the invention. The method includes receiving, within at least one of a resource management application or an online resource management portal, a plurality of inputs from a user and determining, based on the first inputs, a resource-related competency level for the user. The method further includes determining a plurality of services that are associated with the resource-related competency level, and providing, within the resource management application or the online resource management portal, user-access to the plurality of services.

In specific embodiments the method further comprises receiving, within at least one of a resource management application, and an online resource management portal, a plurality of first inputs from a user, and determining, based on the first inputs, an initial resource-related competency level for the user. The method further includes determining a plurality of first services that are associated with the initial resource-related competency level, and presenting, within at least one of a resource management application, and an online resource management portal, user-access to the plurality of first services. In addition, the method includes receiving, on an ongoing basis within at least one of a resource management application, and an online resource management portal, a plurality of second inputs from the user, and determining, based on the second inputs and machine-learning techniques, an increased resource-related competency level for the user. Further, the method includes determining a plurality of second services that are associated with the increased res-resource-related competency level, and presenting, within at least one of a resource management application, and an online resource management portal, user-access to the plurality of second services. In related embodiments of the method the receiving the plurality of first inputs includes receiving the plurality of first inputs associated with a resource management onboarding procedure that includes establishing an identity of the user absent the user providing a textual input; and associating a resource storage entity to the identity.

A computer program product including a non-transitory computer-readable medium defines third embodiments of the invention. The computer-readable medium includes a first set of codes for causing a computer to receive, within at least one of a resource management application or an online resource management portal, a plurality of inputs from a user. Additionally, the computer-readable medium includes a second set of codes for causing a computer to determine, based on the first inputs, a resource-related competency level for the user. Further, the computer-readable medium includes a third set of codes for causing a computer to determine a plurality of services that are associated with the resource-related competency level, and a fourth set of codes for causing a computer to provide, within the resource management application or the online resource management portal, user-access to the plurality of services.

Thus, according to embodiments of the invention, which will be discussed in greater detail below, the present invention provides for making specified resource management services available to a user through a mobile application and/or online portal based on their determined level of resource management competency. Further, an intuitive platform for resource management is provided that can provide instinctual guidance throughout the entire lifecycle of a user's engagement with the resource management entity, including but, not limited to, onboarding, providing services to the users, allowing the user to conduct resource interactions and the like.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
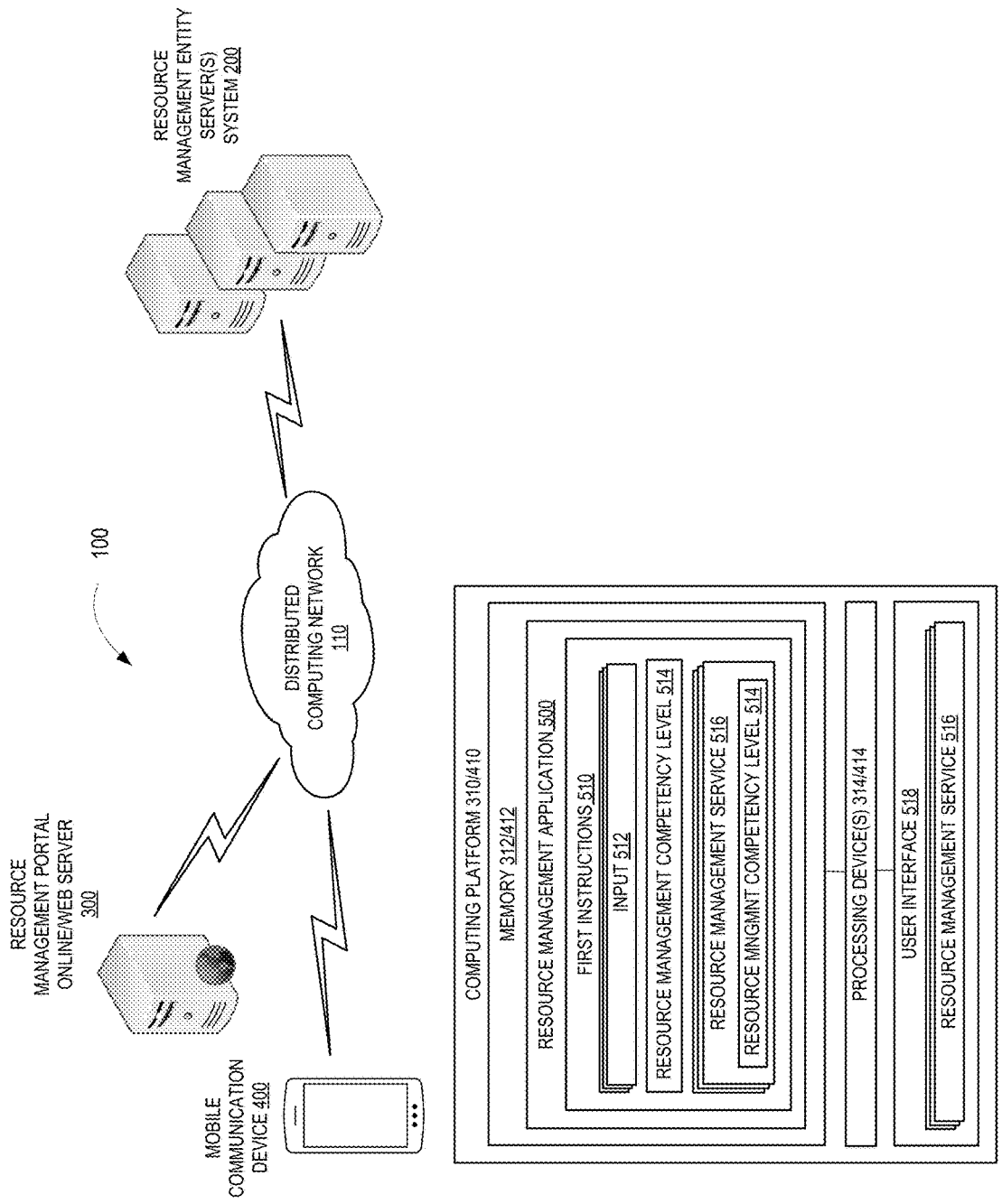
Figure 2:
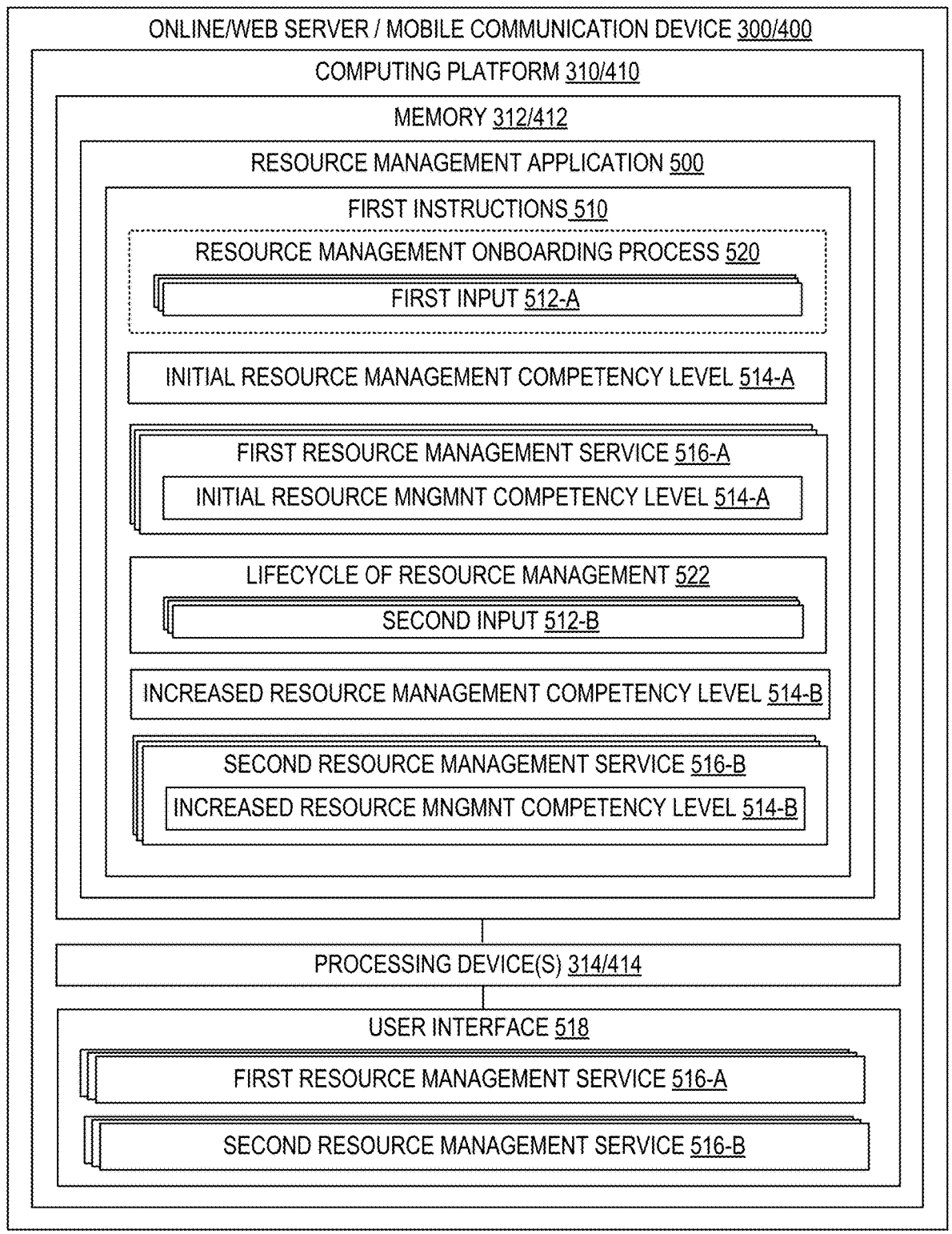
Figure 3:
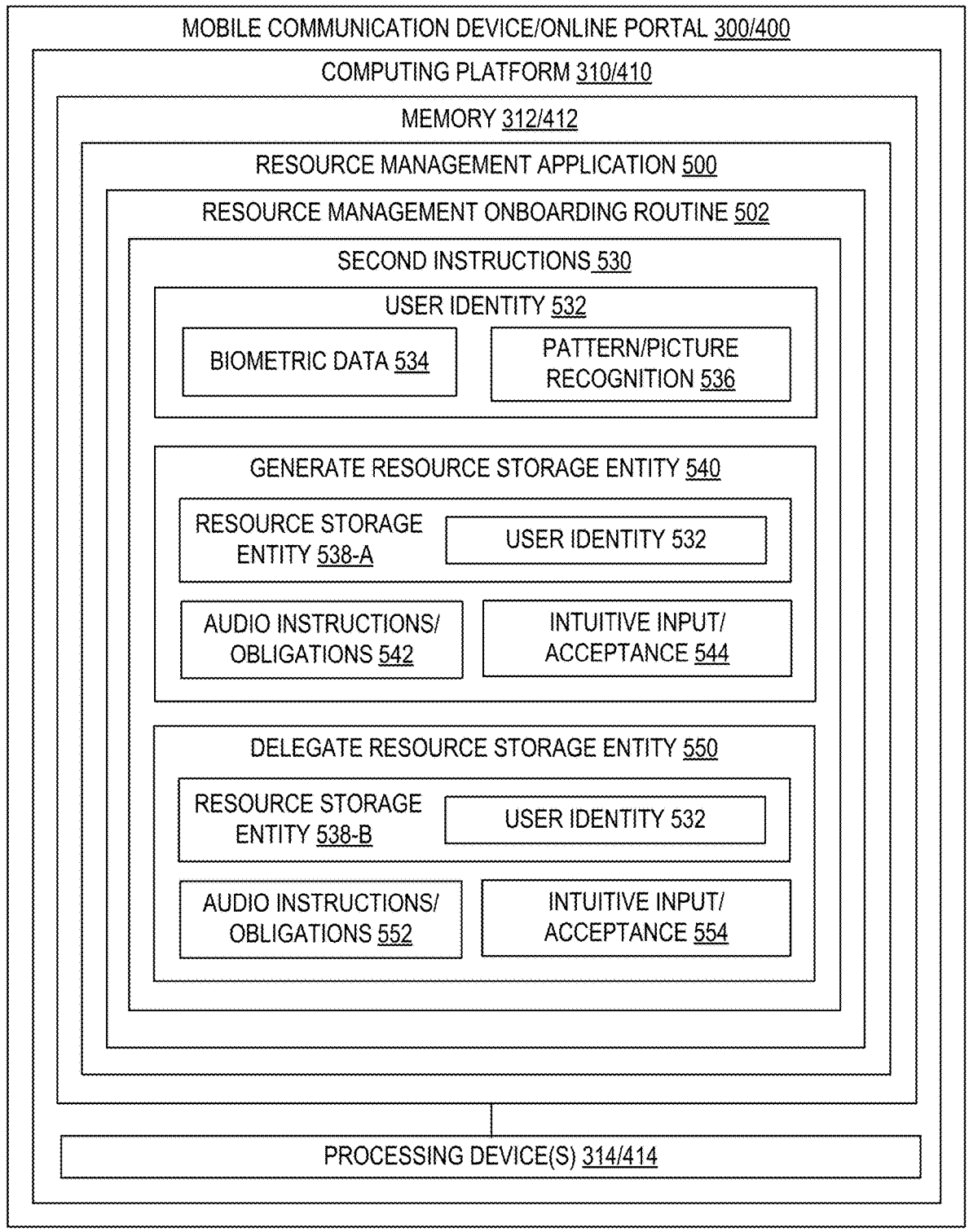
Figure 4:
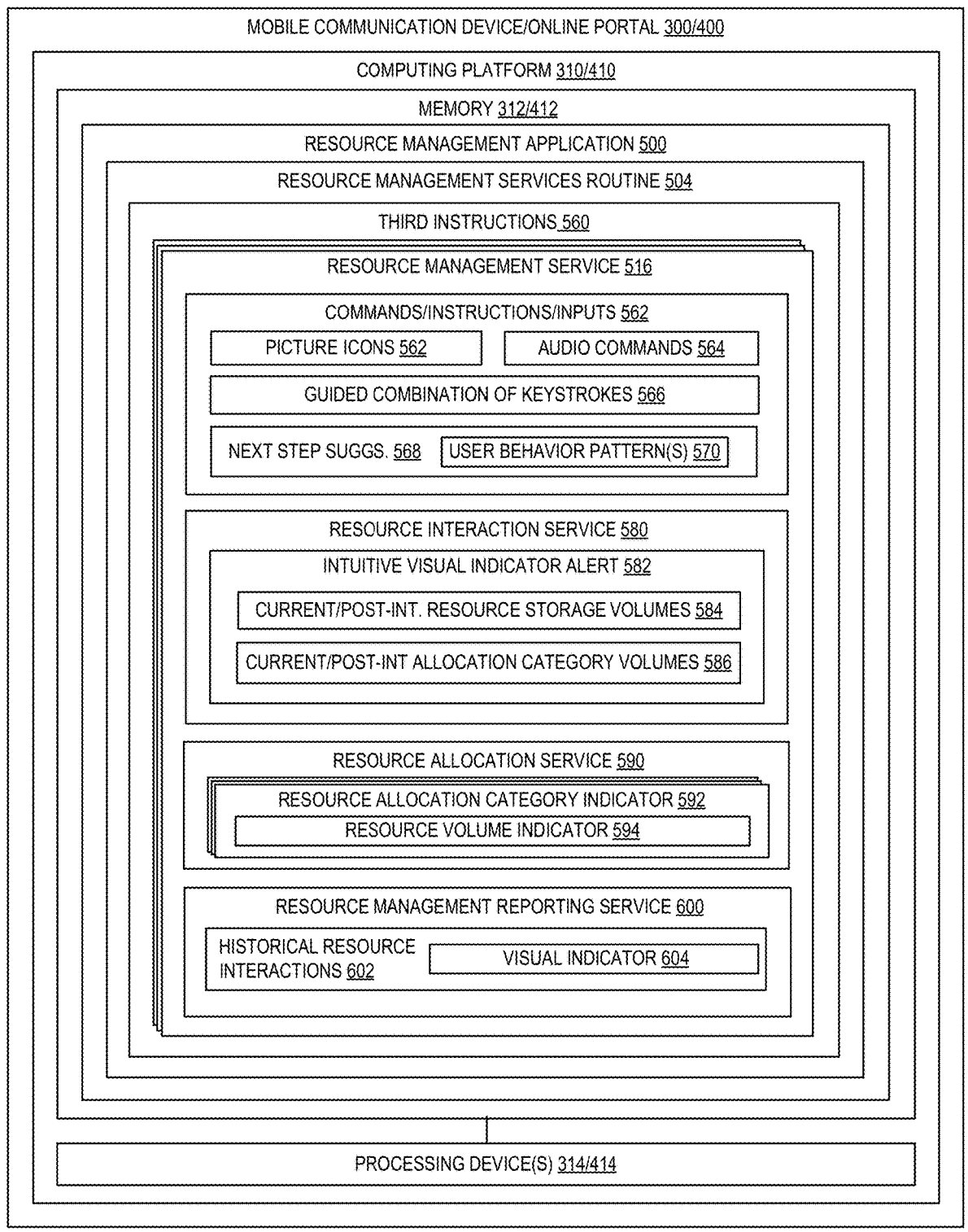
Figure 5:
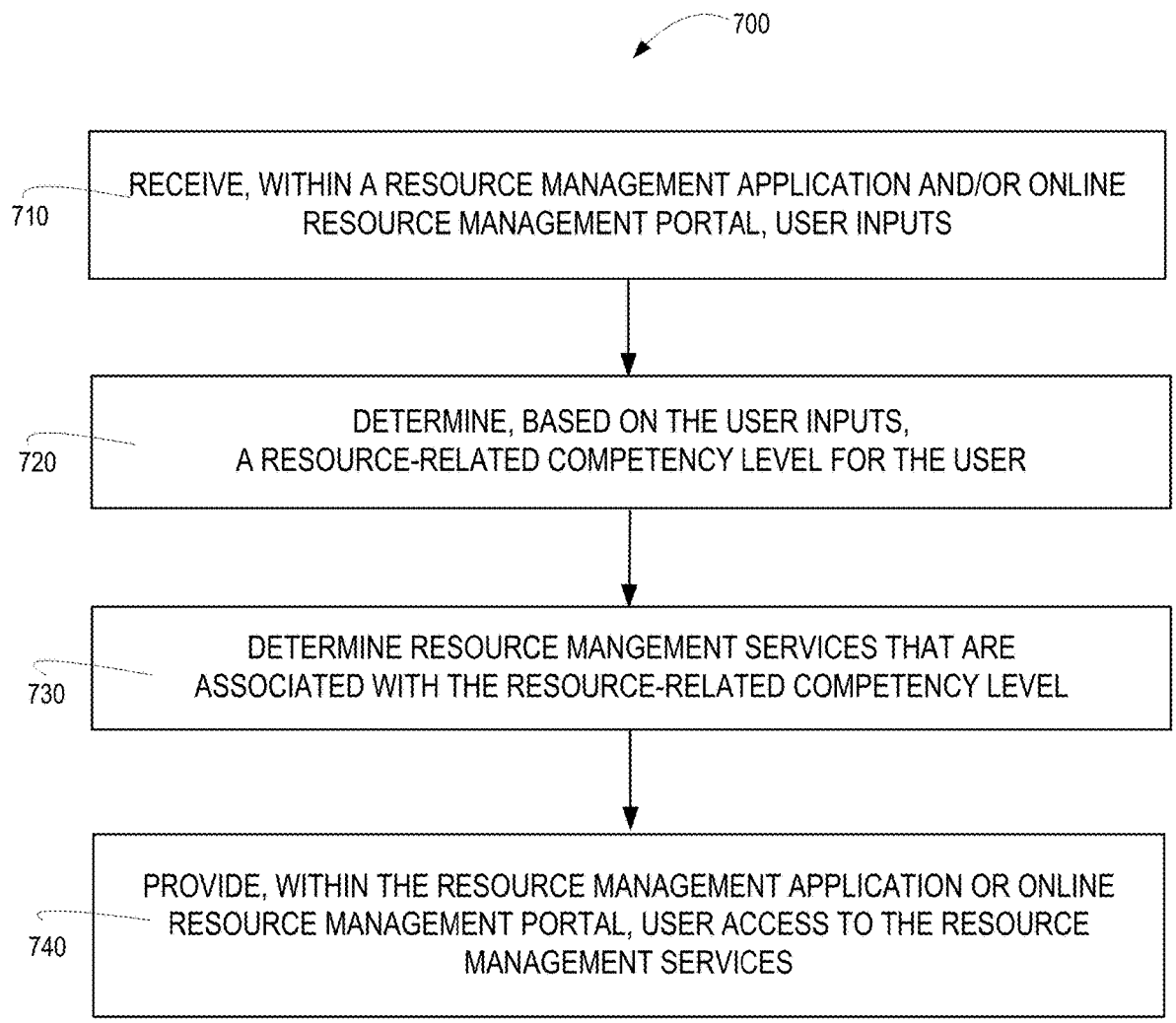
Figure 6:
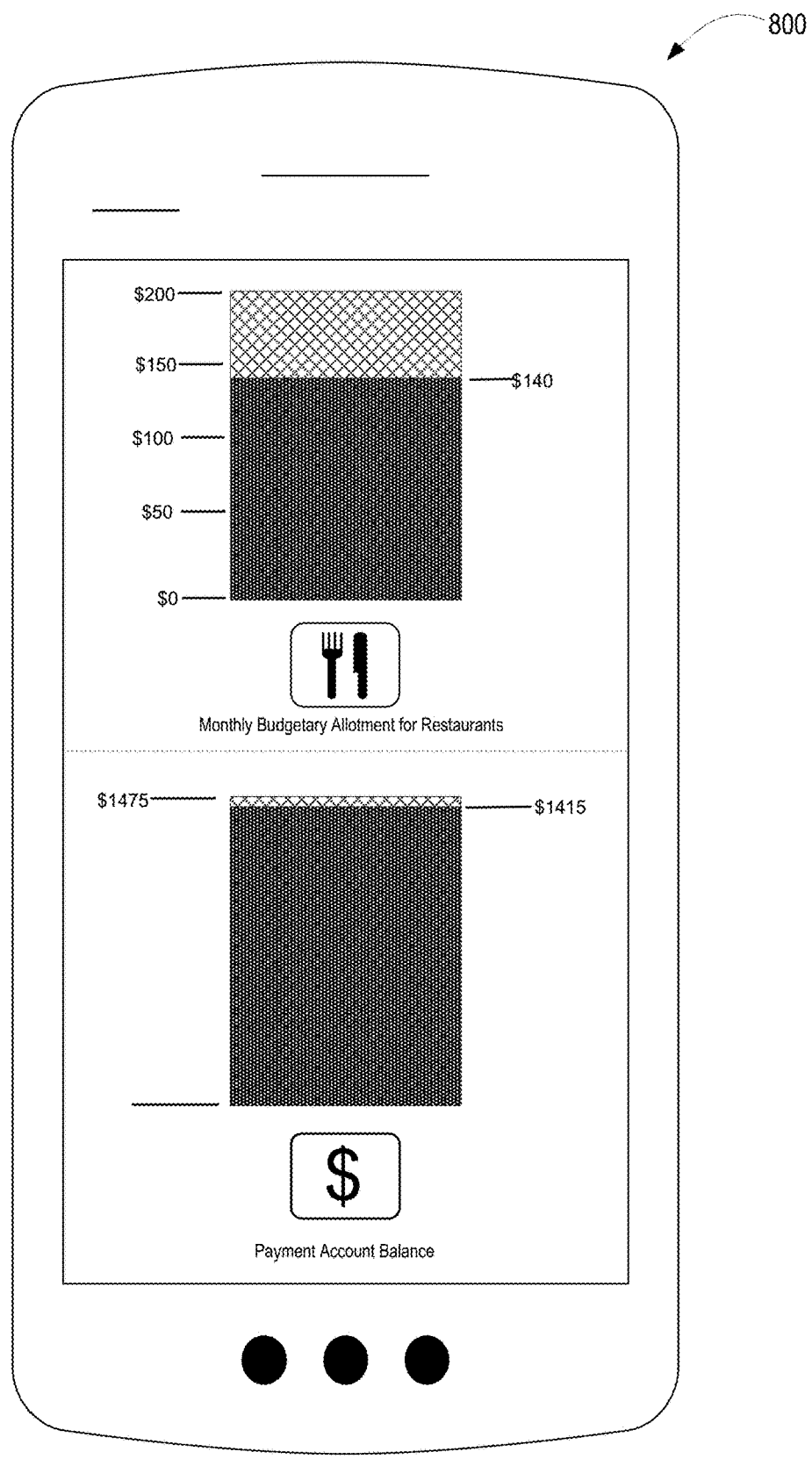

Having thus described embodiments of the disclosure in general terms, reference will now be made to the accompanying drawings, wherein:

FIG. 1 is a schematic diagram of a system for providing resource management services to user based on a determined level of resource management competency, in accordance with some embodiments of the present disclosure;

FIG. 2 is a block diagram of resource management application configured to provide resource management services to user based on a determined level of resource management competency, in accordance with some embodiments of the present disclosure;

FIG. 3 is a block diagram of a resource management application configured to provide intuitive resource management onboarding, in accordance with embodiment of the present invention;

FIG. 4 is a block diagram of a resource management application configured to provide intuitive resource management services, in accordance with embodiments of the present invention;

FIG. 5 is flow diagram of a method for providing resource management services to user based on a determined level of resource management competency, in accordance with embodiments of the present invention; and FIG. 6 is a schematic diagram of a mobile communication device providing display of an alert configured for presenting intuitive display of resource allocation volume and resource storage entity volume in conjunction with a resource interaction, in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as a system, a method, a computer program product or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as JAVA, PERL, SMALLTALK, C++, PYTHON or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or systems. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" perform or "configured for" performing a certain function in a variety of ways, including, for example, by having one or more general-purpose circuits perform the function by executing particular computer-executable program code embodied in computer-readable medium, and/or by having one or more application-specific circuits perform the function.

Thus, according to embodiments of the invention, which will be described in more detail below, systems, methods and computer program products are disclosed that provide a user of a mobile application and/or online portal access to resource management services based on the user's determined level of resource management competency. In specific embodiments of the invention, initial inputs to a mobile application and/or online portal, such inputs received during an onboarding process, are accessed to determine the user's initial level of resource management competency and, in response, specified resource management services are made accessible to the user. Over time, further inputs to the mobile application and/or online portal are received and machine learning techniques are implemented to determine if, and when, the user's resource management competency level has increased. In response to determining that the user's resource management competency level has increased, additional services are made accessible to the user.

In additional embodiments of the invention an intuitive platform for resource management is provided. The resource management platform of the present invention aids users which may not the possess the skills and/or resource management competency required of conventional resource management platforms. The intuitive management resource management platform, which may comprise a mobile application, an online portal or the like, is capable of providing instinctual guidance throughout the entire lifecycle of a user's engagement with a resource management entity, including but, not limited to, onboarding, providing services to the users, allowing the user to conduct resource interactions and the like.

In specific embodiments of the invention a delegator (i.e., another more competent user) is assigned to the user to assist in rendering services (e.g., the delegator holds a resource depository and the user/delegatee has access to at least a portion of the resources held therein).

Turning now to the figures, FIG. 1 illustrates a system 100 for providing resource management services to a user based on a determined level of resource management competency, in accordance with embodiments of the present invention. The system 100 is implemented in a distributed computing network 110, which may include the Internet, and/or one or more intranets or the like. The system may, according to specific embodiments, include a resource management entity system 200, a resource management online portal server 300 and/or a mobile communication application 400.

The resource management online portal server 300 or the mobile communication device 400 include a computing platform 310, 410 having a memory 313, 412 and at least one processing device 314, 414 in communication with the memory 312, 412. The memory 312, 412 stores resource management application 500 configured to provide a user with access to resource management services 516 based on their determined level of resource management competency. In this regard, a user is only provided access to resource management services that meet their level of resource management competency and is not able to access services which require a higher level of resource management competency. Both the user and the resource management entity benefit from insuring that the user does not access, and perform functions related to, resources management services that are beyond the user's level of competency/comprehension.

In specific embodiments of the invention, either one or both of the resource management online portal server 300 and/or the mobile communication device 400 may serve as the platform for hosting the resource management application.

The resource management application 500 includes first instructions 510 which are configured to receive inputs 512 from the user in the course of the user interacting with the resource management application 500. Based on the inputs 512, the instructions are further configured to determine a resource management competency level 514 for the user. Thus, the inputs 512 may be general inputs to the resource management application 500 or inputs specifically tailored to gain an understanding of the user's resource management competency (e.g., questionnaires, tutorials or the like). The resource management competency level 514 may be based on the user's ability to comprehend written or oral language, perform standard resource management tasks, possess resource management skills and the like.

In response to determining the resource management competency level 514, the instructions are further configured to determine a set (i.e., one or, typically, more) of resource management services 516 that are tailored for the user based on their respective resource management competency level 514. It should be noted that the determination of the resource management competency level 514 and/or the resource management services may be performed locally (i.e., at the online portal server 300 or mobile communication device 400) or may be performed at the resource management entity system 200. In those embodiments in which the determination of the resource management competency level 514 and/or the resource management services is performed locally, communication with the resource management system 200 may be necessary to retrieve other determinative information, such as user data file information, user configuration information or the like.

In response to determining the set of resource management services 516, a user interface 518 (e.g., a mobile communication display or the like) provides user access to the resource management services 516. In this regard, the resource management application 500 may be configured with resource management services 516 that can be "locked" and/or "unlocked" depending on which resource management services 516 are deemed to within the resource management level of competency of the user. In other embodiments of the invention, different versions of the resource management application 500 may be associated with different sets of resource management services 516 (i.e., different levels of resource management competency), such that a determination of a set of resource management services 516 will automatically prompt replacement of an existing version with the download and presentation of an updated version of the resource management application.

In specific embodiments of the invention, the resource management application 500 is an online banking portal or mobile banking application. In such embodiments of the invention the first instructions 510 are configured to receive and analyze the user's inputs 512 at the online banking portal or mobile banking application to determine the user's financial competency level 514. The inputs 512 may be general inputs at the online banking portal and/or mobile banking application or inputs specifically tailored to gain an understanding of the user's financial competency (e.g., general and/or finance specific questionnaires, request to view finance-related tutorials, feedback provided to such tutorials or the like). The financial competency level 514 may be based on the user's ability to comprehend written or oral language, perform standard financial tasks at the online banking portal or within the mobile banking application, possess specific financial/banking skills and the like. In such embodiments, the instructions 510 are further configured to determine a set (i.e., one or, typically, more) of financial services 516 that are tailored for the user based on their respective financial competency level 514. For example, financial services may include but are not limited to, ability to perform financial transactions, ability to apply for loans/mortgages, ability to make financial investments (e.g., securities) and the like.

Referring to FIG. 2 a block diagram is presented of an online/web server 300 or mobile communication device 400 for providing resource management services to a user based on a determined level of resource management competency, in accordance with specific embodiments of the invention. The server 300 or mobile communication device includes a computing platform 310, 410, which may comprise one or more computing devices (e.g., servers, computing devices, or the like), is configured to execute instructions 510, 530 560, such as algorithms, modules, routines, applications and the like. Computing platform 310, 410 includes memory 312, 412, which may comprise volatile and non-volatile memory, such as read-only and/or random-access memory (RAM and ROM), EPROM, EEPROM, flash cards, or any memory common to computing platforms). Moreover, memory 312, 412 may comprise cloud storage, such as provided by a cloud storage service and/or a cloud connection service.

Further, computing platform 310, 410 also includes at least one processing device 314, 414, which may be an application-specific integrated circuit ("ASIC"), or other chipset, logic circuit, or other data processing device. Processing device(s) 314, 414 may execute one or more application programming interface (APIs) (not shown in FIGS. 2-4) that interface with any resident programs, such as instructions 510, 530, 560 or the like, stored in the memory 312, 412 of the computing platform 310, 410 and any external programs. Processing devices(s) 314, 414 may include various processing subsystems (not shown in FIG. 2. 2-4) embodied in hardware, firmware, software, and combinations thereof, that enable the functionality of the computing platform 310, 410 and the operability of the computing platform 310, 410 on the distributed computing network 110 (shown in FIG. 1). For example, processing subsystems allow for initiating and maintaining communications and exchanging data with other networked devices. For the disclosed aspects, processing subsystems of processing device 314, 414 may include any subsystem used in conjunction with instructions 510, 530, 560 and related tools, routines, sub-routines, algorithms, sub-algorithms, sub-modules thereof.

Computing platform 310, 410 may additionally include a communications module (not shown in FIGS. 2-4) embodied in hardware, firmware, software, and combinations thereof, that enables electronic communications between the computing platform 310, 410 and other network devices, such as resource management system servers 200 (shown in FIG. 1). Thus, communication module may include the requisite hardware, firmware, software and/or combinations thereof for establishing and maintaining a network communication connection with one or more network devices.

Memory 312, 412 of computing platform 310, 410 stores first instructions 510 that are configured to are executable by the processing device(s) 314, 414 and configured to provide resource management services to a user based on a determined level of resource management competency. Specifically, the first instructions are configured to receive first inputs 512-A from the user in the course of the user initially interacting with the resource management application 500. For example, the first inputs 510 may be associated with a resource management onboarding process 520 in which the user provides identity credentials and associated the identity with a resource storage entity or the like. Based on receiving the first inputs 512-A, the first instructions 510 are further configured to determine an initial resource management competency level 514-A for the user. The first inputs 512-A may be general inputs that the user provides to the resource management application 500 while initially engaging the application or inputs specifically tailored to gain an understanding of the user's resource management competency (e.g., questionnaires, tutorials or the like).

In response to determining the initial resource management competency level 514-A, the first instructions 510 are further configured to determine a set (i.e., one or, typically, more) of first resource management services 516-A that are tailored for the user based on their respective initial resource management competency level 514-A. In response to determining the set of first resource management services 516-A, a user interface 518 (e.g., a mobile communication display or the like) provides user access to the first resource management services 516-A.

Additionally, instructions 510 are configured to receive, an ongoing basis during the user's lifecycle 522 of resource management, second inputs 512-B from the user in the course of the user's continuous interaction with the resource management application 500. For example, the second inputs 512-B may be associated with any of the resource management services initially or currently accessible to the user or the second inputs may be specifically tailored to gain an understanding of the user's resource management competency/acumen. Based on receiving the second inputs 512-B, the first instructions 510 are further configured to determine an increased resource management competency level 514-B for the user. In such embodiments of the invention, the first instructions 510 may be configured to constantly (i.e., dynamically) monitor, using machine-learning techniques, artificial intelligence or the like, the second inputs 512-B to determine when the user's resource management competency level has increased by a requisite amount such that additional resource management services can be made accessible to the user. In response to determining the increased resource management competency level 514-B, the first instructions 510 are further configured to determine a set of second resource management services 516-A that are tailored for the user based on their respective increased resource management competency level 516-A. The set of second resource management services 516-B may be limited to additional resource management services not included in the set of first resource management services 516-A or the set of second resources management services 516-B may include one or more services that replace a service from the currently accessible set of services (i.e., the initial set or some subsequent set of services). For example, a user may initially be provided access to a service that offers some but not all features or is tailored for a lower competency user and the second services may replace that service with a service that offers all of the features or is tailored for a higher competency user. In response to determining the set of second resource management services 516-B, a user interface 518 (e.g., a mobile communication display or the like) provides user access to the second resource management services 516-B.

In specific embodiments of the invention, in which, as discussed previously, the resource management application 500 is an online banking portal or mobile banking application, the first instructions 510 may be configured to receive and analyze the user's first inputs 512-A received at the online banking portal or mobile banking application to determine the user's initial financial competency level 514-A. The first inputs 512-A may be associated with an onboarding process 520, in which the user enrolls in online/ mobile banking or the like. In such embodiments, the instructions 510 are further configured to determine a set (i.e., one or, typically, more) of first financial services 516-A that are tailored for the user based on their respective initial financial competency level 514-A. Once the user has been provided access to the first financial services 516-A via the online portal and/or mobile application, the first instructions 510 are configured to receive, on an ongoing basis during the user's lifecycle 522 of being a customer of the financial institution, second inputs 512-B from the user in the course of the user's continuous interaction with the online portal and/or mobile banking application 500. For example, the second inputs 512-B may be associated with any of the financial services initially or currently accessible to the user or the second inputs may be specifically tailored to gain an understanding of the user's financial competency/acumen. Based on receiving the second inputs 512-B, the first instructions 510 are further configured to determine an increased financial competency level 514-B for the user. In such embodiments of the invention, the first instructions 510 may be configured to constantly (i.e., dynamically) monitor, using machine-learning techniques, artificial intelligence or the like, the second inputs 512-B to determine when the user's financial competency level has increased by a requisite amount such that additional financial services can be made accessible to the user. In response to determining the increased financial competency level 514-B, the first instructions 510 are further configured to determine a set of second financial services 516-A that are tailored for the user based on their respective increased financial competency level 516-A.

Referring to FIG. 3 an additional block diagram is presented of an online/web server 300 or mobile communication device 400 for providing intuitive onboarding of users to resource management or a resource management application, in accordance with embodiments of the present invention. Thus, in the embodiments shown in FIG. 3 the resource management application 500, shown and discussed in relation to FIG. 2, includes a resource management onboarding routine 502 that includes second instructions 530 stored in memory 314, 412 and executable by processing device(s) 314, 414. The resource management onboarding routine 502 assumes that the user may have limited resource management capacity, including limited ability to comprehend written language. Second instructions 530 are configured to establish a user identity 532 absent a user providing a textual input (i.e., absent a user providing a username and/or password/code as the means by which identity is established and verified). In specific embodiments of the invention, identity may be established by the user providing biometric data 534. The biometric data 534 may include, but is not limited to, fingerprint data, image data (i.e., facial-recognition techniques or the like) or the like. In such embodiments of the invention, the user may be prompted through non-textual visual indicators to provide their fingerprint to an applicable fingerprint reader mechanism or the application may automatically launch and execute an image-capturing device that captures an image of the user. In other embodiments of the invention, user identity 532 may be established via pattern/picture recognition 536. For example, a user may be prompted via non-textual visual indicators to select or provide one or more patterns or pictures, which serve to identify and subsequently verify the user.

In response to establishing the user identity 532, the user identity 532 is associated with one or more resource storage entities 538. In specific embodiments of the invention, associating the user identity 532 with a resource storage entity 538 includes generating 540 the resource storage entity 538-A. In such embodiments of the invention, the user may be presented with non-textual instructions and/or obligations 542 required for generating 540 the resource storage entity 538-A, such as audio instructions and/or obligations. Additionally, the second instructions 530 are configured to provide for non-textual user acceptance inputs 544 for accepting the obligations. For example, the microphone may be activated to provide oral inputs, color-coded radio buttons or the like may be provided or a means for a user to electronically sign may be provided. In specific embodiments of the invention, in which the user identity 532 is being associated with a financial institution account, generating the financial institution account may include presenting the user with non-textual (e.g., audible outputs) instructions for generating the financial institution account and/or a contract associated with generating the financial institution account. In addition, the user may provide requisite inputs for generating the financial institution account absent providing textual inputs. For example, the microphone may be enabled for the user to provide verbal acceptance of the contract/financial institution account and/or inclusion of an electronical signature, color coded radio buttons may be provided (e.g., green-colored radio buttons for accepting a financial institution account contract and red-colored radio buttons for declining a financial institution account contract) or the like.

In other embodiment of the invention, associating the user identity 532 with a resource storage entity 538 includes delegating 550 the user to use a resource storage entity 538-B held by another user. In such embodiments of the invention, the user may be presented with non-textual instructions and/or obligations 552 required for agreeing to the delegation, such as audio instructions and/or obligations. Additionally, the second instructions 530 are configured to provide for non-textual user acceptance inputs 554 for accepting the obligations of the delegation. For example, the microphone may be activated to provide oral inputs, color-coded radio buttons or the like may be provided or a means for a user to electronically sign may be provided. In specific embodiments of the invention, in which the user identity 532 is being associated with a financial institution account, delegating the user to use the financial institution account held by another (e.g., a child being delegated use of a guardian's account or the like) may include presenting the user with non-textual (e.g., audible outputs) obligations/contract associated with accepting the delegation of the financial institution account. In addition, the user may provide requisite inputs accepting the delegation of the financial institution account absent providing textual inputs. For example, the microphone may be enabled for the user to provide verbal acceptance of the delegation financial institution account and/or inclusion of an electronical signature, color coded radio buttons may be provided (e.g., green-colored radio buttons for accepting a financial institution account contract and red-colored radio buttons for declining a financial institution account contract) or the like.

Referring to FIG. 4 an additional block diagram is presented of an online/web server 300 or mobile communication device 400 for providing intuitive services within a resource management mobile/online application including providing intuitive alerts to the user at the time of resource interaction indicating volumes of resources in resource storage and/or an allocation category, in accordance with embodiments of the present invention. Thus, in the embodiments shown in FIG. 4 the resource management application 500, shown and discussed in relation to FIGS. 2 and 3, includes a resource management services routine 504 that includes third instructions 560 stored in memory 314, 412 and executable by processing device(s) 314, 414. The resource management service routine 504 assumes that the user may have limited resource management capacity, including limited ability to comprehend written language.

Third instructions 530 are configured to include provide intuitive commands/instructions and receive inputs 562 in the accessible resource management services 516 that are, in some embodiments, have limited text or are non-textual, or include other indicators in addition to text. For example, the commands/instructions 562 may include picture or other visual icons 562, audio commands 564. Inputs 562 may include guided combination of keystrokes 566, and next step suggestions 568 based on previous inputs (i.e., user behavior patterns 570).

In specific embodiments of the invention, the resource interaction service 580 is configured to provide a user with intuitive visual indicator alerts 582 in response to initiating or conducting a resource interaction. In response to a user initiating a resource interaction, the third instructions 560 may be configured to determine the current volume of resources in the user's resource storage entity and the volume or percentage of the resources that will be in the user's resource storage entity post-resource interaction 584. In related embodiments, the third instructions 560 may be configured to determine the current volume of resources in the resource allocation category associated with the category of the resource interaction and the volume or percentage of the resources that will be in the user's resource allocation category post-resource interaction 586. Further, the third instructions 560 are configured to generate and communicate, via NFC, cellular network or the like, an alert 582 to the user that provides a visual indicator of the current volume and/or percentage of resources in the user's resource storage entity and/or resource allocation category and the volume and/or percentage of the resources that will be in the user's resource storage entity or resource allocation category post-resource interaction. The visual indicator may be a graphical indicator (e.g., bar graph, pie-chart, line graph or the like) which may or may not include text, such as numeric values indicating the actual volume of resources. In this regard, the user is able to see the impact that the resource interaction has on their volume of resources or the specific resource allocation category and, in some instances, in which the alert is received and comprehending by the user prior to finalizing the resource interaction, choose to forego the resource interaction.

The resource interaction service may include additional third instructions 560 configured to generate and initiate communication of alerts to third parties/delegators who may be required to authorize a resource interaction if the volume of resources involved in the resource interaction exceeds a predetermined threshold. The configuration of the predetermined threshold may be set by the third party/delegator, the user or the resource management entity.

In specific embodiments of the invention, in which, as discussed previously, the resource management application 500 is an online banking portal or mobile banking application, the third instructions 560 may be configured to determine the current amount of funds in the user's payment account and the amount or percentage of funds that will remain in the payment account after the payment transaction has been completed. In related embodiments, the third instructions 560 may be configured to determine the current amount funds available in budgetary category and the amount or percentage of funds in that budgetary category that will be remain after completion of the transaction. Further, the third instructions 560 are configured to generate and communicate, via NFC, cellular network or the like, an alert 582 to the user, while the user is conducting the financial transaction (or in some embodiments shortly thereafter) that provides a visual indicator of the current amount and/or percentage of funds in the user's payment account and/or budgetary category and the amount and/or percentage of the funds that will be in the user's payment account or budgetary category post-financial transaction. The visual indicator may be a graphical indicator (e.g., bar graph, pie-chart, line graph or the like) which may or may not include text, such as numeric values indicating the actual amount or percentage of funds in or remaining in the account or budgetary category. In example of such an alert is shown and discussed infra in relation to FIG. 6.

In additional specific embodiments of the invention, in which, as discussed previously, the resource management application 500 is an online banking portal or mobile banking application, the third instructions 560 may be configured to generate and initiate communication of alerts to third parties/delegators who may be required to authorize financial transaction if the amount involved in the financial transaction exceeds a predetermined threshold. The configuration of the predetermined threshold amount may be set by the third party/delegator, the user or the financial institution.

In further embodiments of the invention the resource management services 516 may include a resource allocation service 590 that provides for a user to intuitively assign resource volume indicators 594 to specified resource allocation category indicators 592. In specific embodiments of the invention, the resource allocation category indicators 592 are picture icons or the like that indicate various different categories and the resource volume indicators 594 may be sliding scales or the like that allow the user to choose the volume or percentage of resources to assign to a category. In specific embodiments of the invention, in which the resource management application 500 is an online banking portal or mobile banking application, the resource allocation service 590 is a spending/budgeting service that provides for the user to intuitively assign budget amounts to specified budget categories. For example, the user may select picture icons corresponding to budget categories and use a sliding-scale or the like to indicate the amount or percentage to assign to budget category.

Moreover, in further embodiments of the invention the resource management services 516 may include a resource management reporting service 600 that is configurable by the user to generate and communicate, on a predetermined schedule or on demand, highly intuitive reports that include visual indicators 604 (e.g., graphs or the like) that indicate historical resource interactions 602 and/or other historical data related to other resource management services provided to the user. In specific embodiments of the invention, in which the resource management application 500 is an online banking portal or mobile banking application, the resource management reporting service 600 is a financial service reporting service configured to generate and communicate highly intuitive reports to a user that tracks historical financial transactions performed by the user or other financial service activities by presenting graphs or other non-textual visual indicators that can easily be understood by users having minimal financial service competency.

Referring to FIG. 5 a flow diagram of a method 700 for providing resource management services to a user based on a determined level of resource management competency, in accordance with embodiments of the present invention. At Event 710 inputs are received from a user at a resource management application or online resource management portal. The inputs are received in the course of the user interacting with the resource management application or online resource management portal. In specific embodiments of the invention the inputs are general inputs to the resource management application or resource management portal or inputs specifically tailored to gain an understanding of the user's resource management competency (e.g., questionnaires, tutorials or the like). In specific embodiments the inputs are associated with a user onboarding process, such as establishing identity and associating the entity with a resource storage entity. In specific embodiments of the method, in which the resource management application or online resource management portal is a mobile banking application or an online banking portal, the inputs may be any input received with the course of interacting with the mobile banking application and/or online banking portal.

At Event 720, a resource management competency level is determined for the user based at least on the received inputs. As previously discussed, the resource management competency level may be based on the user's ability to comprehend written or oral language, perform standard resource management tasks, possess resource management skills and the like. It should be noted that the determination of the resource management competency level 514 may not be based solely on the inputs, in that, other known information concerning the user that may aid in the determination may also be used. In specific embodiments of the method, in which the resource management application or online resource management portal is a mobile banking application or an online banking portal, the resource management competency level may be a financial competency level that gauges a user's ability to perform standard financial tasks and/or possess financial management/service skills.

At Event 730, in response to determining the resource management competency level, a plurality of resource management services is determined that are associated with (i.e. tailored for the user based on) the determined resource management competency level. It should be noted that the determined of the resource management services may not be solely based on the resource management competency level, in that, other factors may go into determining the services such as user data file information, user configuration information or the like. In specific embodiments of the method, in which the resource management application or online resource management portal is a mobile banking application or an online banking portal, the resource management services may include, but are not limited to, certain types of financial transactions, loan applications, mortgage applications, investment services and the like.

In response to determining the set of resource management services, at Event 740, the user is presented access to the determined set of resource management services via user interface (e.g., display) of the device being used to execute the resource management application or access the online resource management portal. In this regard, the resource management application or online resource management portal may be configured with resource management services that can be "locked" and/or "unlocked" depending on which resource management services are deemed to within the resource management level of competency of the user.

Referring to FIG. 6 a schematic diagram is presented of a mobile communication device 800 configured to display an intuitive alert, in accordance with embodiments of the present invention. It should be noted that the example shown in FIG. 6 is merely one way of configuring the alert and should not be perceived as being limited. Those of ordinary skill in the art will appreciate that the alert may be configured in various other manners so as to align with the various inventive concepts herein disclosed. As shown the alert includes bar graphs. The bar graph on the top portion of the display is related the monthly budgetary allotment for restaurants as indicated by the intuitive visual indicator depicting a fork and knife. While the illustrated example of FIG. 6 shows a textual description of the budget category, in other embodiments of the invention the textual description of the budgetary category may or may not be included within the alert. The bar graph indicates on quick glance that the restaurant transaction has or will use less than half of the monthly budgetary allotment. Specifically, the numeric values, which may or may not be included within the alert, indicate that the user has a monthly budget of $200 for restaurant expenditures and that after the current transaction $140 remain in the monthly budget (i.e., the current restaurant expenditure is for $60).

The bar graph on the bottom portion of the display is related to the payment account balance as indicated by the intuitive visual indicator depicting a dollar sign. While the illustrated example of FIG. 6 shows a textual description of the payment account balance, in other embodiments of the invention the textual description of the payment account balance may or may not be included within the alert. The bar graph indicates on quick glance that the restaurant transaction has made or will make a marginal impact on the user's payment account balance. Specifically, the numeric values, which may or may not be included within the alert, indicate that the user has a current balance in the payment account of $1475 and that after the current transaction $1415 remains in the payment account (i.e., indicative of the current $60 restaurant expenditure). In other embodiments of the invention the visual indicators/graphical indicators may be based on percentages rather than or in addition to specific amounts.

Thus, present embodiments of the invention provide for making specified resource management services available to a user through a mobile application and/or online portal based on their determined level of resource management competency. Further, an intuitive platform for resource management is provided that can provide instinctual guidance throughout the entire lifecycle of a user's engagement with the resource management entity, including but, not limited to, onboarding, providing services to the users, allowing the user to conduct resource interactions and the like.

The features, functions, and advantages that have been discussed may be achieved independently in various embodiments of the present invention or may be combined with yet other embodiments, further details of which can be seen with reference to the following description and drawings.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for financial services management, the system comprising:
  a mobile communication device comprising a computing platform having a memory and at least one processing device in communication with the memory; and
  a mobile banking application of a first version stored in the memory, including first instructions that are executable by the at least one processing device and configured to:
    receive a plurality of first inputs from a user;
    determine, based on the first inputs, a financial competency level for the user;

determine a plurality of first financial services that meet the financial competency level;

in response to determining the plurality of first financial services, prompt a download, to the mobile communication device, of a second version of the mobile banking application that replaces the first version, wherein the second version of the mobile banking application is configured to provide the user access to only the plurality of first financial services;

receive, on an ongoing basis throughout a lifecycle of the mobile banking application, a plurality of second inputs from the user;

determine, based on the second inputs and machine-learning techniques, an increased financial competency level for the user;

determine a plurality of second financial services that meet the increased financial competency level; and in response to determining the plurality of second financial services, prompt a download, to the mobile communication device, of a third version of the mobile banking application that replaces the second version, wherein the third version of the mobile banking application is configured to provide the user access to only the plurality of first and second financial services.

2. The system of claim 1, wherein the mobile banking application further comprises a mobile banking onboarding routine stored in the memory, including second instructions that are executable by the at least one processing device and configured to:

establish an identity of the user without the user providing a textual input; and in response to establishing the identity of the user, associate a financial account to the identity.

3. The system of claim 2, wherein the second instructions are further configured to associate the financial account to the identity by delegating the user to use the financial account held by a secondary user.

4. The system of claim 3, wherein the second instructions are further configured to delegate the financial account to the user by providing an audio output that reads financial account delegation instructions and obligations to the user and provides for the user to provide a non-textual input for accepting delegation of the financial account.

5. The system of claim 2, wherein the second instructions are further configured to establish an identity of the user by receiving biometric data from the user.

6. The system of claim 2, wherein the second instructions are further configured to establish an identity of the user by implementing at least one of pattern and picture recognition techniques.

7. The system of claim 2, wherein the second instructions are further configured to associate the financial account to the identity by creating the financial account for the user without the user providing textual input.

8. The system of claim 7, wherein the second instructions are further configured to create the financial account by providing an audio output that reads financial account instructions and obligations to the user and provides for the user to provide a non-textual input for accepting creation of the financial account.

9. The system of claim 1, wherein the mobile banking application further comprises a financial service routine stored in the memory, including third instructions configured to:

instruct the user to interact with accessible financial services exclusively via one or more non-textual commands.

10. The system of claim 9, wherein the third instructions are further configured to:

instruct the user to perform a financial service transaction via one or more non-textual commands, wherein the non-textual commands include one or more of picture icons, audio commands, guided combination of keystrokes, and automatic suggestions for a next step based on one or more user patterns of behavior.

11. The system of claim 9, wherein the third instructions are further configured to, in response to the user initiating the financial service transaction:

determine a current volume of funds in a financial account associated with the financial service transaction;

determine a post-financial service transaction volume remaining in the financial account after completion of the financial service transaction; and present, to the user via a display of the mobile communication device, non-numeric visual indicators that indicate the current volume of funds in the financial account and the post-financial service transaction volume of funds that will be remaining in the financial account after conducting the financial service transaction.

12. The system of claim 9, wherein the third instructions are further configured to:

provide the user an ability to create one or more budgetary spending categories with non-textual visual indicators that indicate a funding allocation category and non-numeric visual indicators to indicate an amount of funds resources designated to the one or more budgetary spending categories for a predetermined time period.

13. The system of claim 12, wherein the third instructions are further configured to, in response to the user initiating the resource interaction:

determine a budgetary spending category for the financial service transaction;

determine a current volume of funds in the budgetary spending category;

determine a post-financial service transaction volume of funds remaining in the budgetary spending category; and present, to the user via the display of the mobile communication device, non-numeric visual indicators that indicate the current volume of funds in the budgetary spending category and the post-financial service transaction volume of funds that will be remaining in the budgetary spending category after conducting the financial service transaction.

14. The system of claim 9, wherein the third instructions are further configured to:

determine at least one of (i) a financial service transaction amount exceeds a predetermined financial service transaction threshold, and (ii) a financial service transaction amount exceeds a predetermined budgetary spending category threshold;

in response to determining at least of (i) and (ii), notify a predetermined third-party entity of the financial service transaction; and receive approval for the financial service transaction to proceed from the predetermined third-party entity.

15. The system of claim 9, wherein the third instructions are further configured to generate and initiate communication of a financial management report to at least the user, wherein the financial management report includes non-numeric and non-textual visual indicators indicating historical financial services transactions and volume of funds in one or more associated financial accounts.

16. A computer-implemented method for management, the method implemented by one or more computing device processors and including:
   receiving, within a first version of a mobile banking application executing on a mobile communication device, a plurality of first inputs from a user;
   determining, based on the first inputs, a financial competency level for the user;
   determining a plurality of first financial services that meet the financial competency level;
   in response to determining the plurality of first financial services, prompt a download, to the mobile communication device, of a second version of the mobile banking application that replaces the first version, wherein the second version of the mobile banking application is configured to provide the user access to only the plurality of first financial services;
   receiving, on an ongoing basis throughout a lifecycle of the mobile banking application, a plurality of second inputs from the user;
   determining, based on the second inputs and machine-learning techniques, an increased financial competency level for the user;
   determining a plurality of second financial services that meet the increased financial competency level; and
   in response to determining the plurality of second financial services, prompting a download, to the mobile communication device, of a third version of the mobile banking application that replaces the second version, wherein the third version of the mobile banking application is configured to provide the user access to only the plurality of first and second financial services.

17. The method of claim 16, wherein receiving the plurality of first inputs further comprising receiving the plurality of first inputs associated with a mobile banking application onboarding procedure that comprises:
   establishing an identity of the user without the user providing a textual input; and
   associating a financial account to the identity.

18. A computer program product comprising:
   a non-transitory computer-readable medium comprising:
   a first set of codes for causing a computer to receive, within a first version of a mobile banking application executing on a mobile communication device, a plurality of first inputs from a user;
   a second set of codes for causing a computer to determine, based on the first inputs, a financial competency level for the user;
   a third set of codes for causing a computer to determine a plurality of first financial services that meet the financial competency level;
   a fourth set of codes for causing a computer to, in response to determining the plurality of first financial services, prompt a download, to the mobile communication device, of a second version of the mobile banking application that replaces the first version, wherein the second version of the mobile banking application is configured to provide the user access to only the plurality of first financial services;
   a fifth set of codes for causing a computer to receive, on an ongoing basis throughout a lifecycle of the mobile banking application, a plurality of second inputs from the user;
   a sixth set of codes for causing a computer to determine, based on the second inputs and machine-learning techniques, an increased financial competency level for the user;
   a seventh set of codes for causing a computer to determine a plurality of second financial services that meet the increased financial competency level; and
   an eighth set of codes for causing a computer to, in response to determining the plurality of second financial services, prompt a download, to the mobile communication device, of a third version of the mobile banking application that replaces the second version, wherein the third version of the mobile banking application is configured to provide the user access to only the plurality of first and second financial services.

* * * * *